(12) United States Patent
Dauzat

(10) Patent No.: US 10,082,810 B2
(45) Date of Patent: Sep. 25, 2018

(54) VOLTAGE REGULATOR SYSTEM AND METHOD OF USE

(71) Applicant: General Electric Technology GmbH, Baden (CH)

(72) Inventor: Thomas Ambrose Dauzat, Shreveport, LA (US)

(73) Assignee: General Electric Technology GMBH, Baden (CH)

( * ) Notice: Subject to any disclaimer, the term of this patent is extended or adjusted under 35 U.S.C. 154(b) by 0 days.

(21) Appl. No.: 15/385,437

(22) Filed: Dec. 20, 2016

(65) Prior Publication Data
US 2018/0173256 A1  Jun. 21, 2018

(51) Int. Cl.
| | |
|---|---|
| G05F 1/14 | (2006.01) |
| G05F 1/147 | (2006.01) |
| H01F 29/02 | (2006.01) |
| G05F 1/66 | (2006.01) |
| H02M 5/12 | (2006.01) |
| G05F 1/24 | (2006.01) |
| G05F 1/253 | (2006.01) |

(52) U.S. Cl.
CPC ............... *G05F 1/14* (2013.01); *G05F 1/147* (2013.01); *G05F 1/66* (2013.01); *H01F 29/025* (2013.01); *G05F 1/24* (2013.01); *G05F 1/253* (2013.01); *H02M 5/12* (2013.01)

(58) Field of Classification Search
CPC . G05F 1/147; G05F 1/153; G05F 1/24; G05F 1/253; G05F 1/14; G05F 1/66; H01F 29/025; H01F 29/04; H02H 7/222; H02H 9/04; H02M 5/12
See application file for complete search history.

(56) References Cited

U.S. PATENT DOCUMENTS 2,004,792 A   6/1935   McCarty
3,619,764 A   11/1971  Brennan
(Continued)

OTHER PUBLICATIONS

Extended European Search Report and Opinion issued in connection with corresponding EP Application No. 17208307.3 dated May 15, 2018.

*Primary Examiner* — Fred E Finch, III
*Assistant Examiner* — Demetries A Gibson
(74) *Attorney, Agent, or Firm* — Eversheds-Sutherland (US) LLP

(57) ABSTRACT

Embodiments of the disclosure pertain to a voltage regulator system having a voltage regulation controller and a transformer assembly. The transformer assembly includes a coil winding, a multi-contact tap arrangement connected to the coil winding, and a multifurcated tap changer system that includes a first tap changer having a contactor element which makes contact with a first contact of the multi-contact tap arrangement when the controller provides a positioning stimulus based on sensing a voltage deviation from a nominal output voltage of the voltage regulator system. The multifurcated tap changer system further includes a second tap changer that is mechanically ganged to the first tap changer and includes another contactor element arranged to automatically make contact with a second contact of the multi-contact tap arrangement when the contactor element of the first tap changer makes contact with the first contact of the multi-contact tap arrangement.

14 Claims, 7 Drawing Sheets

(56) References Cited

U.S. PATENT DOCUMENTS

| | | | | |
|---|---|---|---|---|
| 3,818,402 | A * | 6/1974 | Golaski | H01F 29/02 323/255 |
| 4,668,921 | A * | 5/1987 | Tamura | H03F 1/0244 323/364 |
| 4,853,608 | A * | 8/1989 | Schrade | H02M 5/12 323/258 |
| 5,550,459 | A | 8/1996 | Laplace | |
| 5,808,454 | A * | 9/1998 | Chung | G05F 1/66 323/255 |
| 5,900,723 | A | 5/1999 | Rostron | |
| 6,218,744 | B1 * | 4/2001 | Zahrte, Sr. | G05F 1/14 307/64 |
| 6,417,651 | B1 * | 7/2002 | Kronberg | G05F 1/14 323/255 |
| 9,329,659 | B2 * | 5/2016 | Cook | G06F 1/3206 |
| 9,680,462 | B2 * | 6/2017 | Petersen | H03K 17/13 |
| 2010/0045246 | A1 * | 2/2010 | Bryant | G05F 1/14 323/255 |
| 2011/0193497 | A1 * | 8/2011 | Finch | H02M 5/12 315/307 |
| 2011/0273149 | A1 * | 11/2011 | Lee | G05F 1/14 323/255 |
| 2012/0200279 | A1 * | 8/2012 | Pamulaparthy | H02J 3/1807 323/301 |
| 2014/0217947 | A1 * | 8/2014 | Haugan | H02M 7/219 318/503 |
| 2014/0327992 | A1 * | 11/2014 | Sykes | H02H 9/04 361/56 |
| 2015/0241900 | A1 * | 8/2015 | Hau | G05F 1/14 307/77 |
| 2016/0041568 | A1 * | 2/2016 | Daley | G05F 1/14 323/341 |
| 2016/0231756 | A1 * | 8/2016 | Baerthlein | G05F 1/14 |

* cited by examiner

VOLTAGE REGULATOR SYSTEM AND METHOD OF USE

FIELD OF THE DISCLOSURE

This disclosure relates to a voltage regulator system, and more particularly, to a voltage regulator system for power line substation, applications and method of use.

BACKGROUND OF THE DISCLOSURE

Power lines are often used to provide electric power to a large number of consumers. Some of these consumers can be residential consumers while others are commercial consumers. Understandably, the amount of power consumed by these two types of consumers can vary during periods of the day as well as during seasons. For example, the amount of power consumed by commercial consumers during a workday can be higher than the amount of power consumed by commercial consumers during the night, whereas the amount of power consumed by residential consumers during the evening hours in a residential area can be higher than the amount of power consumed during the workday. Utility companies typically accommodate such fluctuating power requirements by using various conventional devices. One among these various conventional devices, is a voltage regulator that provides for an increase in the voltage level on a power line when the amount of current drawn through the power line rises, and vice-versa.

In some cases, the amount of current drawn through a power line over a period of time can exceed the current rating of a transformer coil or other elements of a conventional voltage regulator, thereby stressing and/or damaging various components of the voltage regulator. One of these components, which is known in the industry as a tap changer, is used to make contact at one of various tap points in a transformer coil. Excessive operations of the tap changer can not only lead to high wear and tear on the tap changer contacts but can also lead to arcing in some cases. Arcing is undesirable for many reasons, particularly because arcing can be hazardous and can lead to equipment damage, reduction in the lifespan of the equipment, and in some cases catastrophic failure.

BRIEF DESCRIPTION OF THE DISCLOSURE

Embodiments of the disclosure relate to a voltage regulator system, and more particularly, to a voltage regulator system for power line substation, feeder, and industrial (i.e. oil and gas, industrial, wind, irrigation, mining, solar, etc.) applications and methods of use. Certain embodiments of the disclosure can provide a technical effect and/or solution directed to a voltage regulator system that can include a transformer assembly having two or more series windings coupled in parallel with each other, each winding having multiple taps. The parallel coupling of the two or more series windings automatically splits a power line load current among the two or more series windings, thereby burdening each series winding with only a portion of the power line load current. The transformer assembly also has two or more tap changer assemblies that cooperate to allow for simultaneous activation of two or more movable contactor elements that are ganged together. The reduction in current flow through each series winding as a result of the parallel coupling of the series windings, reduces or eliminates the amount of arcing that can occur when the movable contactor elements are activated, thereby, in certain instances, extending the operational life of the voltage regulator system and providing various other benefits.

Certain other embodiments of the disclosure can provide a technical effect and/or solution directed to a voltage regulator system that can include a voltage regulation controller and a transformer assembly. The transformer assembly can include a coil winding, a multi-contact tap arrangement connected to the coil winding, and a multifurcated tap changer system that includes a first tap changer having a contactor element which makes contact with a first contact of the multi-contact tap arrangement when the voltage regulation controller provides a positioning stimulus based on sensing a voltage deviation from a nominal output voltage of the voltage regulator system. The multifurcated tap changer system further includes a second tap changer that is mechanically ganged to the first tap changer and includes another contactor element arranged to automatically make contact with a second contact of the multi-contact tap arrangement when the contactor element of the first tap changer makes contact with the first contact of the multi-contact tap arrangement According to one exemplary embodiment of the disclosure, a voltage regulator system includes a transformer assembly and a voltage regulation controller having a voltage sensing element. The transformer assembly, which is coupled to the voltage regulation controller, can include a coil winding, a first multi-contact tap arrangement, and a multifurcated tap changer system. The first multi-contact tap arrangement, which is connected to the coil winding, includes a first set of contacts. The multifurcated tap changer system includes a first tap changer and a second tap changer. The first tap changer has a first contactor element that makes contact with a first contact in the first set of contacts when the voltage regulation controller provides to the transformer assembly, a first positioning stimulus that is based at least in part on the voltage sensing element sensing a first voltage deviation from a nominal output voltage of the voltage regulator system. The second tap changer is mechanically ganged to the first tap changer, and has a second contactor element that is arranged to automatically make contact with a second contact in the first set of contacts when the first contactor element makes contact with the first contact in the first set of contacts.

According to another exemplary embodiment of the disclosure, a method of regulating voltage using a voltage regulator system includes providing a voltage regulation controller and a transformer assembly coupled to the voltage regulation controller. The voltage regulation controller includes a voltage sensing element. The transformer assembly includes a coil winding, a first multi-contact tap arrangement, and a multifurcated tap changer system. The first multi-contact tap arrangement, which is connected to the coil winding, has a first set of contacts. The multifurcated tap changer system includes a first tap changer having a first contactor element and a second tap changer that is mechanically ganged to the first tap changer, the second tap changer having a second contactor element. The method further includes sensing a first voltage deviation from a nominal output voltage of the voltage regulator system, and in response to sensing the first voltage deviation, placing the first contactor element in contact with a first contact in the first set of contacts, the second contactor element automatically making contact with a second contact in the first set of contacts.

According to yet another exemplary embodiment of the disclosure, a voltage regulator system includes a transformer assembly. The transformer assembly includes a coil winding, a first multi-contact tap arrangement, a second multi-contact tap arrangement, a first tap changer, a second tap changer, and a reversing switch. The first multi-contact tap arrangement, which is connected to the coil winding, has a first set of contacts. The second multi-contact tap arrangement, which is also connected to the coil winding, has a second set of contacts. The first tap changer includes a first contactor element configured to make contact with a first contact of the first set of contacts over a first period of time and a first contact of the second set of contacts over a second period of time. The second tap changer includes a second contactor element that is mechanically ganged to the first contactor element of the first tap changer, the second contactor element arranged to automatically make contact with a second contact of the first set of contacts over the first period of time and a second contact of the second set of contacts over the second period of time. The reversing switch, which is also connected to the coil winding, is operative to electrically couple one of a first end or a second end of the coil winding to an output terminal of the voltage regulator system.

Other embodiments and aspects of the disclosure will become apparent from the following description taken in conjunction with the following drawings.

BRIEF DESCRIPTION OF THE DRAWINGS

Having thus described the disclosure in general terms, reference will now be made to the accompanying drawings, which are not necessarily drawn to scale, wherein like numbers refer to like elements throughout.

Figure 1:
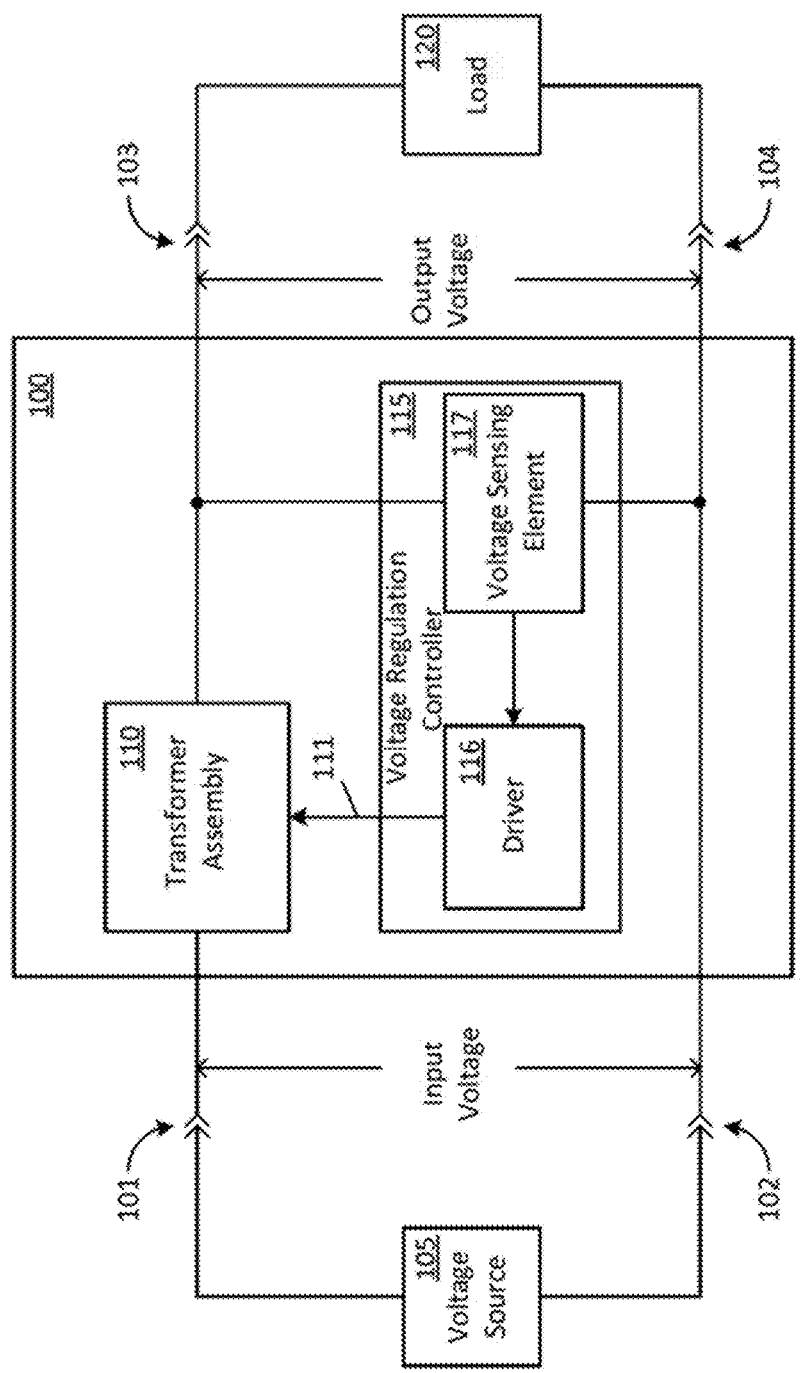

FIG. 1 illustrates an exemplary voltage regulator system in accordance with one exemplary embodiment of the disclosure.

Figure 2:
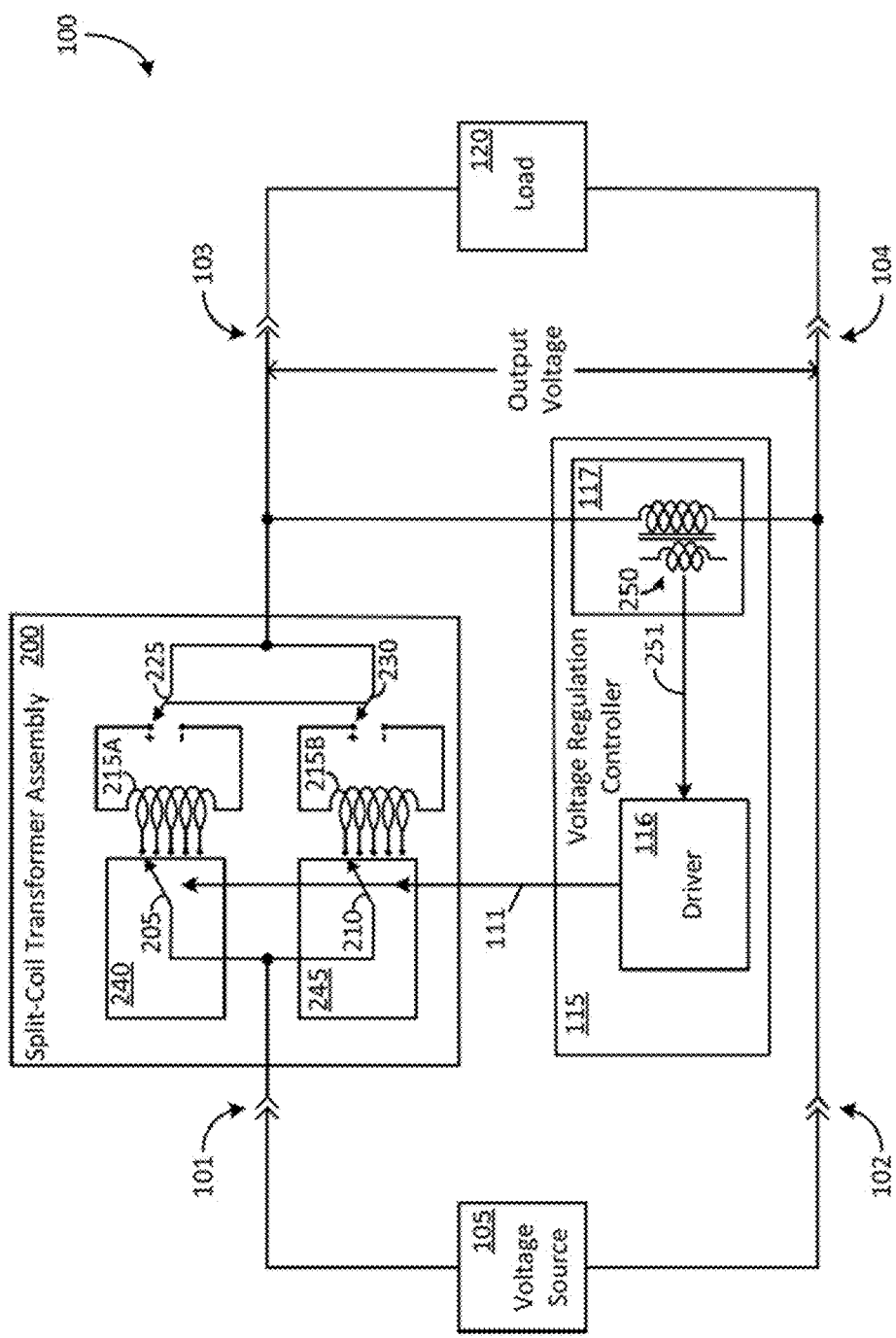

FIG. 2 illustrates a first exemplary implementation of the voltage regulator system shown in FIG. 1.

Figure 3:
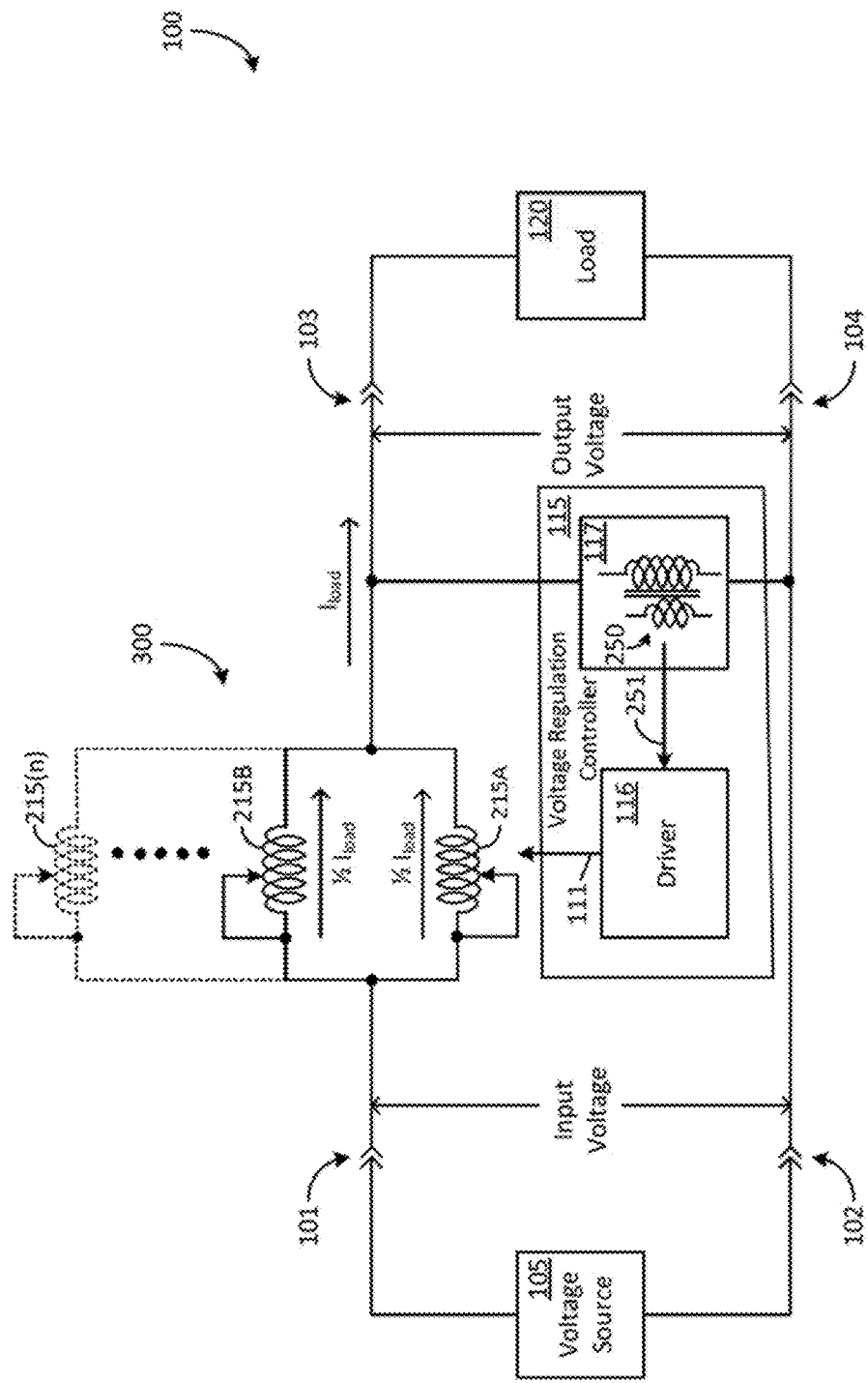

FIG. 3 illustrates some elements of an exemplary transformer assembly, the elements indicated in a symbolic format, in accordance with one exemplary embodiment of the disclosure.

Figure 4:
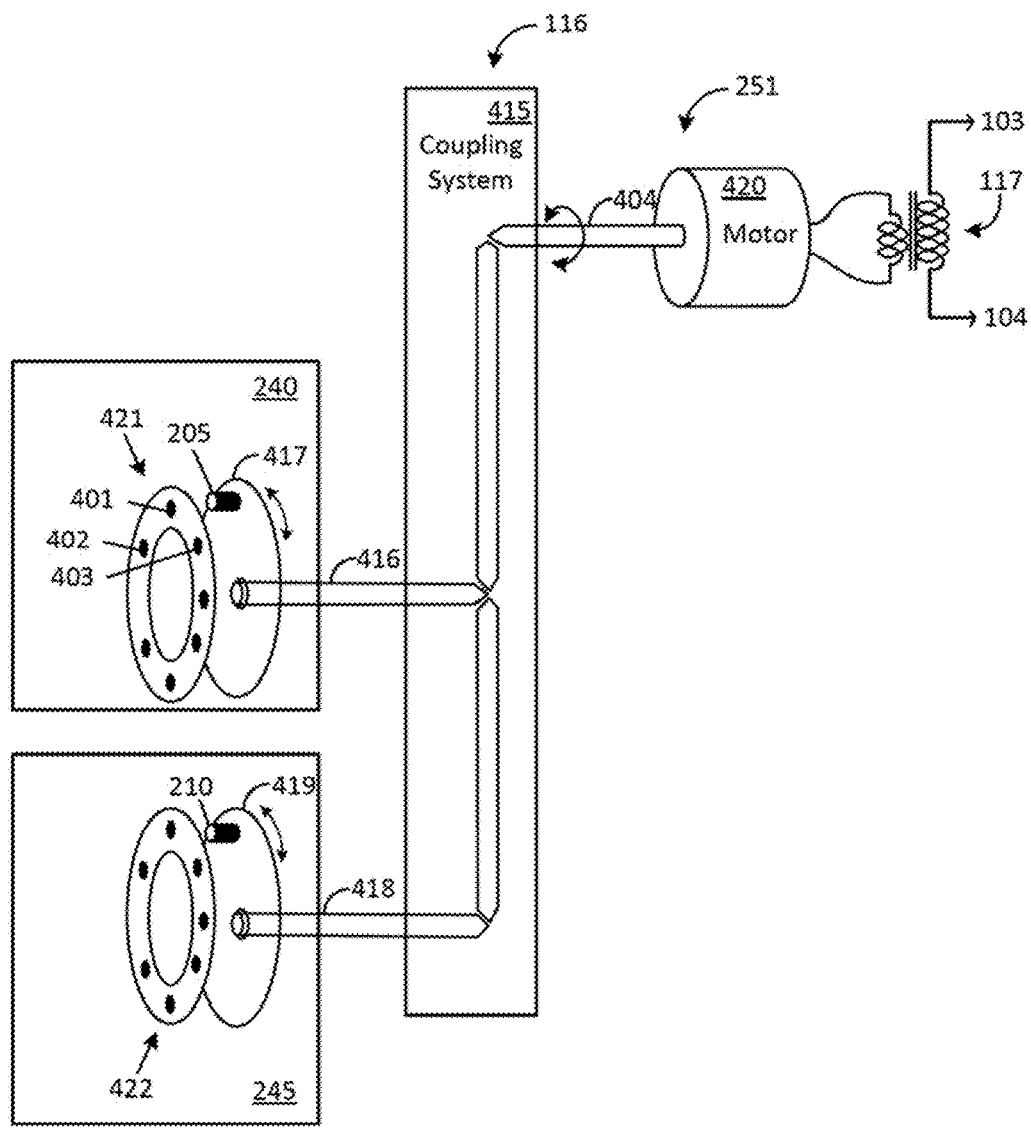

FIG. 4 illustrates an exemplary mechanical arrangement for operating the transformer assembly shown in FIG. 1.

Figure 5:
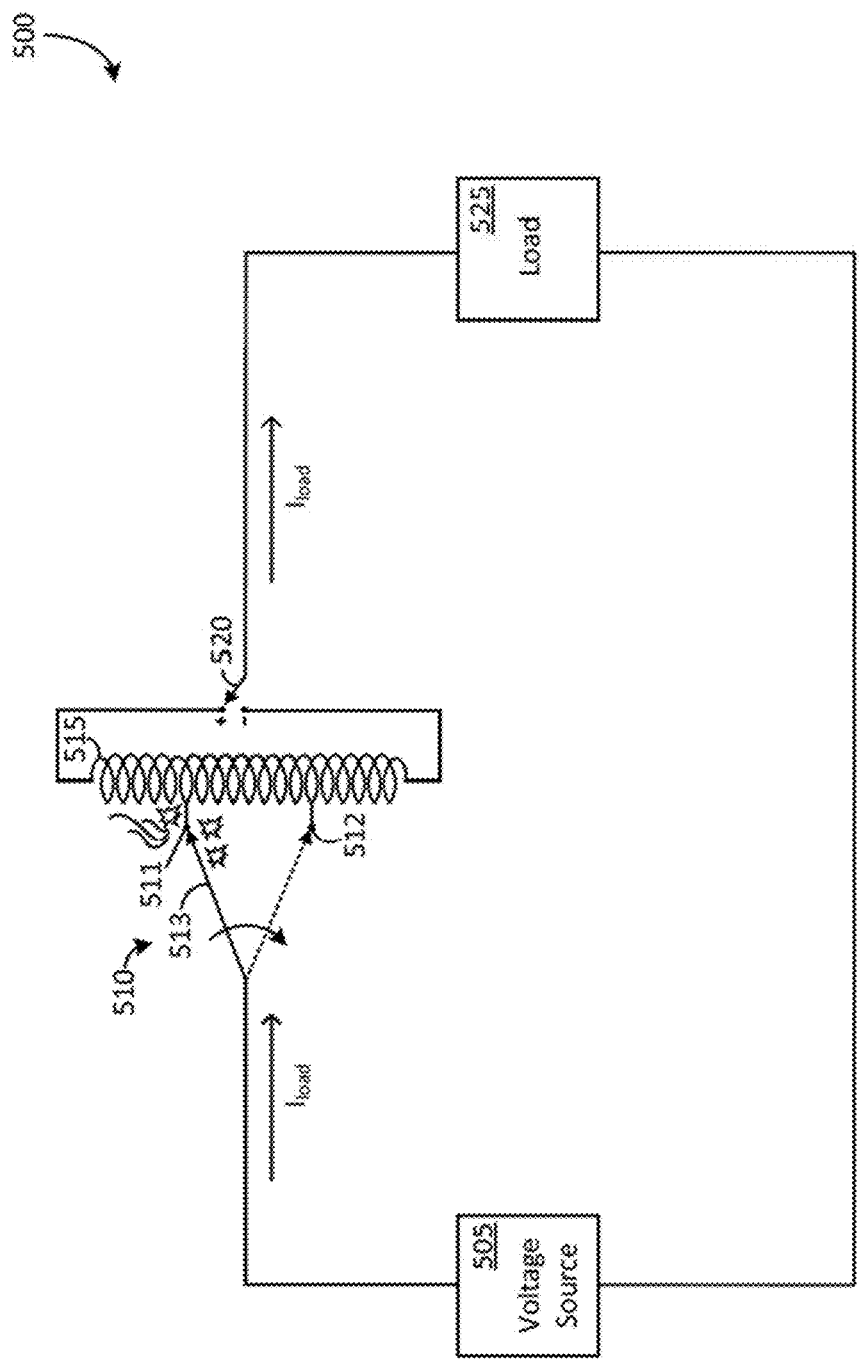

FIG. 5 illustrates an exemplary voltage regulator system having a single coil winding and a single tap changer that is susceptible to damage during operation, in accordance with one exemplary embodiment of the disclosure.

Figure 6:
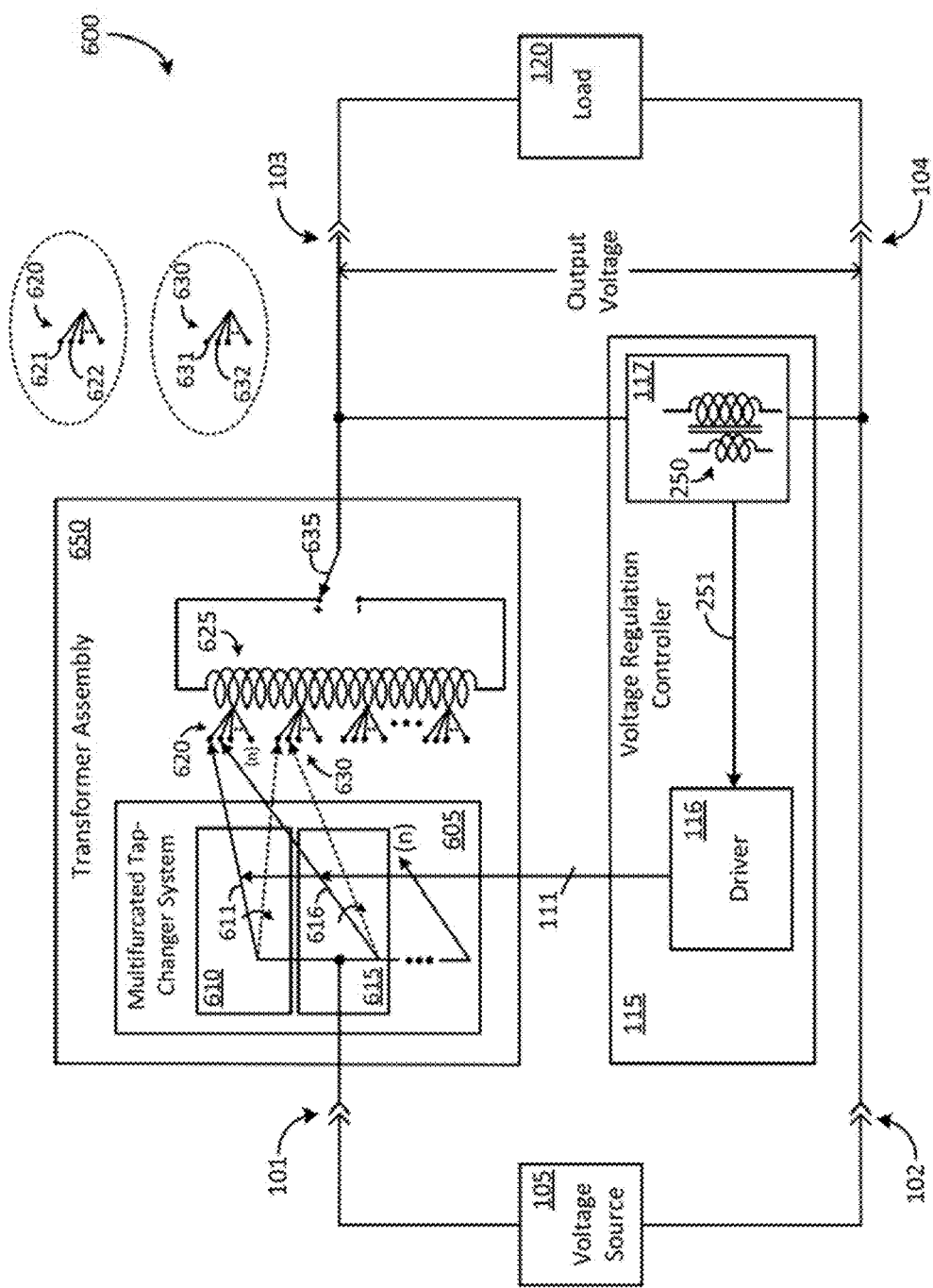

FIG. 6 illustrates a voltage regulator system having a single coil winding and a multifurcated tap changer in accordance with an exemplary embodiment of the disclosure.

Figure 7:
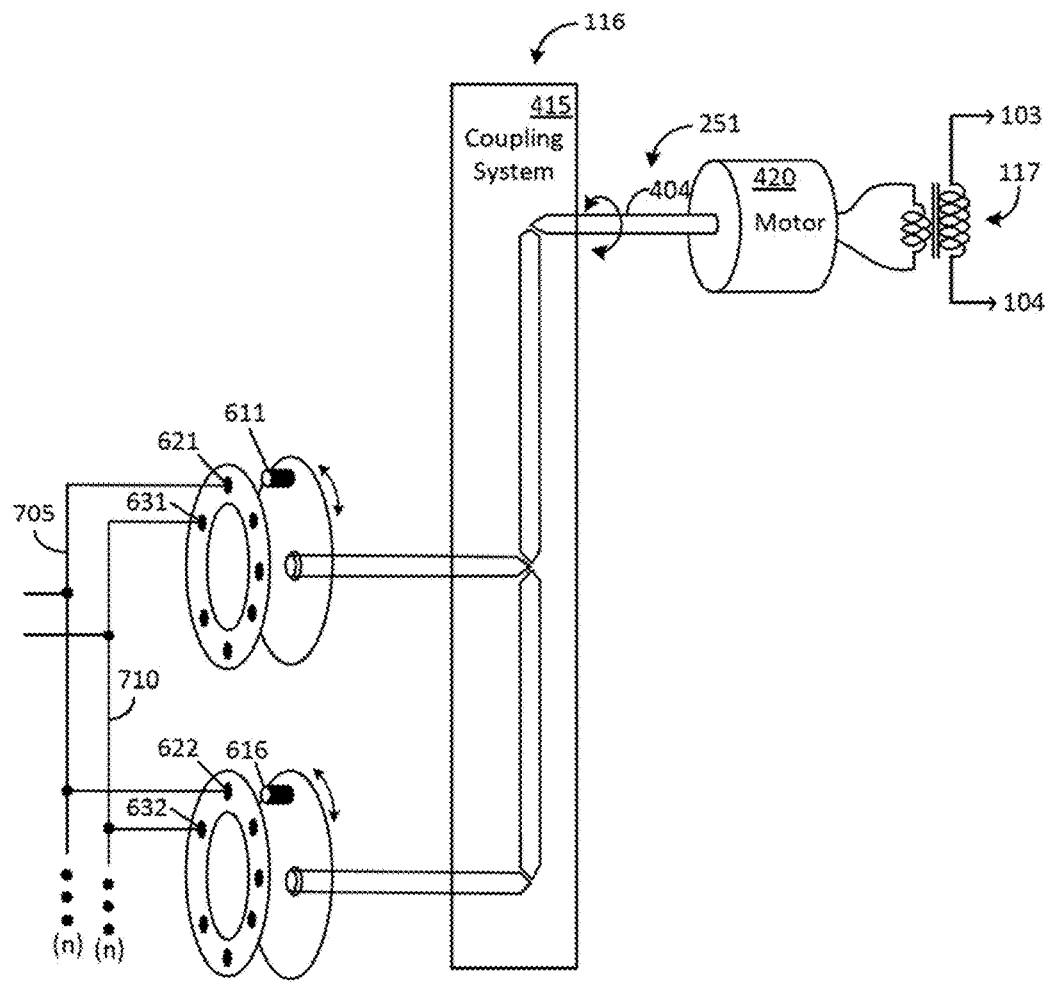

FIG. 7 illustrates an exemplary mechanical arrangement for operating the transformer assembly shown in FIG. 6.

DETAILED DESCRIPTION OF THE DISCLOSURE

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. More particularly, the word "exemplary" as used herein indicates one among several examples, and it should be understood that no undue emphasis or preference is being directed to the particular example being described. Furthermore, the word "example" as used herein is intended to be non-exclusionary and non-limiting in nature It should also be understood that certain words and terms are used herein solely for convenience and such words and terms should be interpreted as referring to various objects and actions that are generally understood in various forms and equivalencies by persons of ordinary skill in the art. Thus, words such as "contactor," "contacts," "taps," "tap changers," "winding," and "coil" as used herein should be understood to refer to various elements that can be implemented in a variety of ways. More generally, a tap refers to one of multiple contacts provided on a winding, and a tap changer can include a movable contactor element like a wiper or a slider that can be moved in order to provide contact with any selected one of the multiple taps. The movable contactor element can be moved using a positioning stimulus provided by a voltage regulation controller in accordance with one or more embodiments of the disclosure.

Attention is now drawn to FIG. 1, which illustrates an exemplary voltage regulator system 100 in accordance with one exemplary embodiment of the disclosure. The voltage regulator system 100 has a pair of input terminals 101 and 102 that can be used to couple a voltage source 105 into the voltage regulator system 100. The voltage source 105 can be one or more components associated with a power plant, such as a power transformer that is coupled to a power generator (a gas turbine power plant, for example) or an alternating current (AC) generator. The voltage regulator system 100 also has a pair of output terminals 103 and 104 that can be used to couple the voltage regulator system 100 to a load 120.

The load 120 symbolically represents power-consuming components coupled to the voltage regulator system 100. The power consuming components can be associated with various power consumers such as residential consumers and commercial consumers. A few examples of power-consuming components associated with residential consumers can include lighting elements, heating elements, cooling elements, and domestic appliances, while a few examples of power-consuming components associated with commercial and industrial consumers can include computers, motors, machinery, and office equipment.

An increase in power consumption by the load 120 can be characterized by an increase in an amount of current drawn from the voltage source 105 and through the voltage regulator system 100. The voltage regulator system 100 can include a transformer assembly 110 and a voltage regulation controller 115. The voltage regulation controller 115 has a voltage sensing element 117 configured to sense an amplitude of the output voltage present across the output terminals 103 and 104 of the voltage regulator system 100 and a driver 116 that is coupled to the voltage sensing element 117. The driver 116 delivers a positioning stimulus to the transformer assembly 110 under control of the voltage sensing element 117.

The voltage regulation controller 115 can be implemented in various ways. In a first exemplary implementation, the voltage sensing element 117 can be a step-down transformer with a primary coil of the step-down transformer connected to the output terminals 103 and 104 and a secondary coil that coupled to the driver 116. In this implementation, the driver 116 can provide to the transformer assembly 110, a positioning stimulus in the form of an electrical signal that is carried over a coupling link 111 (a wire, for example) and coupled into a suitable tap changer element in the transformer assembly 110.

In a second exemplary implementation that is described below in more detail, the voltage regulation controller 115 can be implemented in the form of a synchronous electric motor. A winding of the synchronous electric motor can operate as the voltage sensing element 117 and a rotor shaft of the synchronous electric motor constitutes the driver 116. The coupling link 111 in this second exemplary implementation is a mechanical coupling system that transfers a positioning stimulus (a rotary action of the rotor shaft) into two or more tap changer assemblies in the transformer assembly 110.

Irrespective of the manner in which the voltage regulation controller 115 is implemented, the voltage regulator system 100 operates to provide output voltage regulation by compensating for any changes in output voltage that may occur due to changes in current drawn by the load 120. More particularly, when there is an increase in current drawn by the load 120, the voltage sensing element 117 in the voltage regulation controller 115 senses a drop in the output voltage across the output terminals 103 and 104 of the voltage regulator system 100. The voltage regulation controller 115 then configures the transformer assembly 110 to reduce a voltage drop in the series path of the current. Conversely, when there is a decrease in current drawn by the load 120, the voltage sensing element 117 in the voltage regulation controller 115 senses a rise in the output voltage across the output terminals 103 and 104 of the voltage regulator system 100. The voltage regulation controller 115 then configures the transformer assembly 110 to introduce a larger voltage drop in the series path of the current.

Thus, when an increased current draw by the load 120 leads to about a 10% reduction (for example) in a nominal output voltage of 440V provided by the voltage regulator system 100, the voltage present across the output terminals 103 and 104 will be about 396V (440V−44V). The voltage regulation controller 115 responds by sensing the voltage drop and reducing the voltage drop across the transformer assembly 110 by a suitable amount in order to raise the voltage present across the output terminals 103 and 104 back towards 440V.

On the other hand, when a change in the load 120 leads to about a 10% decrease (for example) in an amount of current drawn out of the voltage regulator system 100, the voltage present across the output terminals 103 and 104 can rise by about 10% to 484V (440V+44V). The voltage regulation controller 115 responds by sensing the voltage rise and increasing the voltage drop across the transformer assembly 110 by a suitable amount in order to adjust the voltage present across the output terminals 103 and 104 back towards 440V.

As mentioned above, in the other exemplary implementation, the voltage sensing element 117 is a winding of a synchronous electric motor and a rotor shaft of the synchronous electric motor is operative to provide the positioning stimulus to the transformer assembly 110 for moving at least one contactor element of a tap changer from one tap to another for selectively increasing or decreasing the voltage drop in the transformer assembly 110.

FIG. 2 illustrates a few exemplary components that can be included in the voltage regulation controller 115 and in the transformer assembly 110 in accordance with an exemplary implementation of the voltage regulator system 100. In this exemplary implementation, the transformer assembly 110 is implemented in the form of a split-coil transformer assembly 200. The split-coil transformer assembly 200 not only addresses certain stress-related and/or damage-related issues due to high current draw by the load 120 but also addresses some arcing-related issues during tap changing operations. In this exemplary embodiment, the voltage sensing element 117 in the voltage regulation controller 115 is a step-down transformer 250. The primary coil of the step-down transformer is connected to the output terminals 103 and 104, which can be at 440V for example. The step-down transformer action provides for a lower voltage that is coupled into the driver 116. The driver 116, which can include a circuit board containing electronic components, can use this lower voltage to generate a positioning stimulus in the form of an electrical signal that is carried over the coupling link 111 into the split-coil transformer assembly 200.

In another example embodiment, as indicated above, the voltage sensing element 117 can be a single winding of a synchronous electric motor. In this implementation, a rotor shaft of the synchronous electric motor steps clockwise when the nominal output voltage at the output terminals 103 and 104 changes in one direction (rises above the nominal voltage, for example) and steps counter-clockwise when the nominal output voltage at the output terminals 103 and 104 changes in an opposite direction (falls below the nominal voltage, for example). The rotor shaft cooperates with the driver 116 to move tap changers inside the split-coil transformer assembly 200 in order to vary the voltage drop provided by the split-coil transformer assembly 200. Additional details of this exemplary implementation will be described below using another figure.

Turning now to the split-coil transformer assembly 200, in this exemplary embodiment, a pair of tap changers 240 and 245 are mechanically ganged to each other. In other exemplary embodiments, more than two mechanically ganged tap changers can be used. The first tap changer 240 includes a contactor element 205 (a wiper or a sliding contactor, for example) that makes contact with a first coil winding 215A. The contactor element 205 has one end connected to the input terminal 101 and another end arranged to make contact under control of a positioning stimulus provided by the voltage regulation controller 115, with any one of several taps provided on the first coil winding 215A. The first coil winding 215A has a first end terminated on a positive terminal and a second end terminated on a negative terminal. A first reversing switch 225 is arranged to provide a selectable contact between one of the positive terminal or the negative terminal and to couple the first end or the second end of the coil winding 215A to the output terminal 103 thereby allowing for reversal of winding sense.

The second tap changer 245 is substantially identical to the first tap changer 240 (but can be different in other implementations). Thus, the second tap changer 245 similarly includes a contactor element 210 (a wiper or a sliding contactor, for example) that makes contact with a second coil winding 215B. The contactor element 210 has one end connected to the input terminal 101 and another end arranged to make contact with any one of several taps provided on the second coil winding 215B, under control of the same positioning stimulus that is provided to the other contactor element 205. The second coil winding 215B has a first end terminated on a positive terminal and a second end terminated on a negative terminal. The reversing switch 230 is arranged to provide a selectable contact between one of the positive terminal or the negative terminal and couple the first end or the second end of the second coil winding 215B to the output terminal 103 thereby allowing for reversal of winding sense of the second coil winding 215B. The reversing switch 230 is mechanically ganged with the reversing switch 225.

As indicated above, the contactor element 205 and the contactor element 210 are both coupled to the input terminal 101, and the reversing switch 225 and the reversing switch 230 are both coupled to the output terminal 103. This arrangement provides for a parallel combination of the first tap changer 240 and the second tap changer 245, as well as for a parallel combination of the first coil winding 215A and the second coil winding 215B.

FIG. 3 illustrates some elements of the split-coil transformer assembly 200 in a symbolic format for purposes of specifically describing certain features provided by the parallel combination of the first coil winding 215A and the second coil winding 215B. If the split-coil transformer assembly 200 were to be implemented in the form of a single coil winding rather than in split-coil form, a load current ($I_{load}$) drawn by the load 120 will propagate in its entirety through the single coil winding. To elaborate upon this aspect, it can be assumed for purposes of description that the split-coil transformer assembly 200 shown in FIG. 2, is implemented by using only the tap changer 240 and the first coil winding 215A (omitting the tap changer 245 and the second coil winding 215B). As a result of this configuration, the load current through ($I_{load}$) flows only the first coil winding 215A, thereby necessitating that the first coil winding 215A have a power dissipation capability to handle the entire load current ($I_{load}$). Furthermore, the single tap changer 240 has to withstand a large amount of arcing when the contactor element 205 is moved from one tap to another during voltage regulation. In some cases, the arcing can be severe enough to readily damage parts of the tap changer 240, while in other cases, a number of arcing events over a period of time can have a cumulative effect that reduces the mean time between failures (MTBF) of the tap changer 240.

Consequently, in accordance with the disclosure, one may use a split-coil winding arrangement 300 containing "n" (n≥2) coil windings coupled in parallel to each other. Thus, in the exemplary embodiment shown in FIG. 3, the coupling of the first coil winding 215A in parallel with the second coil winding 215B accommodates a split in the load current, with each of the first coil winding 215A and the second coil winding 215B propagating only a half amplitude of the load current. Understandably, the load current will be divided exactly in half only when the first coil winding 215A is identical to the second coil winding 215B. However, in some other exemplary embodiments, the first coil winding 215A and the second coil winding 215B can be non-identical, and the load current can be split proportionally between the first coil winding 215A and the second coil winding 215B based on a difference in AC impedance presented by each of the first coil winding 215A and the second coil winding 215B.

The amplitude of the load current carried by each of the first coil winding 215A and the second coil winding 215B can be further reduced in some exemplary implementations, by adding one or more additional coil windings (shown in dashed line format) in parallel with the first coil winding 215A and the second coil winding 215B. Thus, if four identical coil windings are provided in parallel with each other, the amount of the load current ($I_{load}$) flowing through each individual coil winding is equal to one-fourth of the load current provided to the load 120. Similarly, the use of "n" (n≥2) tap changers in place of a single tap changer provides for load current sharing and reduction in arcing as well as contact wear and tear.

The reduction in load current flowing through the use of "n" coil windings and/or "n" tap changers in accordance with the disclosure not only reduces a steady-state power dissipation in each of the "n" coil windings and/or "n" tap changers (in comparison to a single coil winding and/or single tap changer) but can also provide for a significant reduction in arcing when the respective contactor elements are concurrently moved from one tap to another during voltage regulation. This concurrent action of the multiple contactor elements will now be described using the exemplary implementation shown in FIG. 4.

FIG. 4 illustrates an exemplary mechanical arrangement for concurrently operating the contactor element 205 and the contactor element 210 of the split-coil transformer assembly 200 shown in FIG. 2. In this exemplary mechanical arrangement, the voltage regulation controller 115 includes a synchronous electric motor 420 coupled to the voltage sensing element 117. The voltage sensing element 117 is a step-down transformer with a primary coil connected to the output terminals 103 and 104 of the voltage regulator system 100 and a secondary coil that provides power to operate the synchronous electric motor 420. In this exemplary implementation, the coupling link 251 (shown in FIG. 2) is a mechanical coupling system 415 that transfers a positioning stimulus (a rotary action of a rotor shaft 404 of the synchronous electric motor 420) into each of the tap changer 240 and the tap changer 245. More particularly, the mechanical coupling system 415 transfers the positioning stimulus into the tap changer 240 via a first shaft 416 and into the tap changer 245 via a second shaft 418.

The first shaft 416 is inserted through a central opening in a circular element 417 for holding and rotating the circular element 417, while the second shaft 418 is inserted through a central opening in a circular element 419 for holding and rotating the circular element 419. The contactor element 205 is mounted on the circular element 417 and the contactor element 210 is mounted on the circular element 419. In effect, the mechanical coupling system 415 provides a mechanical ganging of the circular element 417 with the circular element 419, whereby a rotary movement of the circular element 417 is automatically replicated by the circular element 419. The mechanical ganging of the circular element 417 with the circular element 419 in turn automatically provides for a coordinated mechanical ganging operation of the contactor element 205 with respect to the contactor element 210. The mechanical coupling system 415 can include one or more of various components such as shafts, gears, pulleys, and belts, that can be used to couple the rotor shaft 404 to the circular element 417 and the circular element 419 in the manner described above.

In one exemplary implementation, the synchronous electric motor 420 rotates the rotor shaft 404 in a clockwise direction to a first angular position when the output voltage changes in one direction (rises above the nominal voltage, for example) and rotates the rotor shaft 404 in a counter clockwise direction to a second angular position when the output voltage changes in an opposite direction (falls below the nominal voltage, for example).

The contactor element 205, which can be implemented in various ways (such as in the form of a spring-finger or a spring-loaded pin), makes contact with one or more of multiple taps located on a circular tap housing 421 that is a part of the split-coil transformer assembly 200 (shown in FIG. 2). More particularly, in this exemplary implementation, the contacting element 205 is arranged to make contact with a tap 401 on the circular tap housing 421 under control of the synchronous electric motor 420 when the output voltage across the load 120 is at a nominal voltage, say 440V, for example. When the output voltage deviates by a first amount below the nominal voltage, the positioning stimulus provided by the rotor shaft 404 of the synchronous electric motor 420 via the mechanical coupling system 415, to the first shaft 416 (a counter-clockwise rotation for example) makes the contacting element 205 rotate away from the tap 401 and make contact with another tap 403 of the circular tap housing 421. When the output voltage deviates further, the positioning stimulus provided by the rotor shaft 404 of the synchronous electric motor 420 to the first shaft 416 (a counter-clockwise rotation for example) makes the contacting element 205 rotate away from the tap 403 to the next adjacent tap and so on. Similarly, when the output voltage deviates by a first amount above the nominal voltage, the positioning stimulus provided by the rotor shaft 404 of the synchronous electric motor 420 mechanical coupling system 415, to the first shaft 416 (a clockwise rotation, for example) makes the contacting element 205 rotate away from the tap 401 and make contact with another tap 402 of the circular tap housing 421.

As can be understood, the positioning stimulus provided by the rotor shaft 404 of the synchronous electric motor 420 mechanical coupling system 415, to the shaft 416 is concurrently provided to the second shaft 418 as well. The rotation of the second shaft 418 causes the contactor element 210 to rotate in synch with the contactor element 205 and make contact with one or more of a number of taps on the circular tap housing 422 that is also a part of the of the split-coil transformer assembly 200 (shown in FIG. 2).

Furthermore, as described above with respect to FIG. 2, the amount of current carried by each of the first coil winding 215A and the second coil winding 215B as a result of the parallel coupling of the two coil windings, is half as much would be carried by a single coil winding (if only a single coil winding was to be used). The reduction in current not only provides for a significant reduction in arcing when the respective contactor elements are concurrently moved from one tap to another during voltage regulation, but also spatially distributes the arcing and the associated heat emission to two separate locations. The two separate locations correspond to the spacing between the first coil winding 215A and the second coil winding 215B in the voltage regulator system 100. The reduction in arcing as well as distribution of heat emission over an extended area can extend the operational life of the voltage regulator system 100 and providing various other benefits.

FIG. 5 illustrates an exemplary voltage regulator system 500 having a single coil winding 515 and a single tap changer 510. The tap changer 510 includes a contactor element 513 (a wiper or a sliding contactor, for example) that moves from making contact with a first tap 511 to a second tap 512 of the single coil winding 515 when the tap changer 510 is provided a positioning stimulus (not shown). As a result of this arrangement, wherein the entire load current ($I_{load}$) propagates through the contactor element 513 and one of the first tap 511 or the second tap 512, the tap contacting operation carried out via the contactor element 513 can be accompanied by excessive arcing (and associated heating) in some cases when the load current has a large amplitude. Furthermore, there can be an undesirable amount of wear and tear on the tap contacts due to this large current flow.

FIG. 6 illustrates a voltage regulator system 600 in accordance with another exemplary embodiment of the disclosure. The voltage regulator system 600 includes a transformer assembly 650 coupled to the voltage regulation controller 115 in a manner similar to that described above with reference to FIG. 2 and other figures. The transformer assembly 650 includes a single coil winding 625 and a multifurcated tap changer system 605. The single coil winding 625, which incorporates a number of multi-contact tap arrangements, has a first end terminated on a positive terminal and a second end terminated on a negative terminal. A reversing switch 635 is arranged to provide a selectable contact between one of the positive terminal or the negative terminal and to couple the first end or the second end of the single coil winding 625 to the output terminal 103 thereby allowing for reversal of winding sense.

The multifurcated tap changer system 605 addresses at least some of the issues encountered by using the single tap changer 510 in the voltage regulator system 500 described above. In this exemplary embodiment, a pair of tap changers 610 and 615 are mechanically ganged to each other. It should be understood that "n" (n≥2) such tap changers can be ganged together in accordance with one or more embodiments of the disclosure. A number of multi-contact tap arrangements (such as a first multi-contact tap arrangement 620 and a second multi-contact tap arrangement 630) are provided on the single coil winding 625. The first tap changer 610 includes a contactor element 611 (a wiper or a sliding contactor, for example) that has a first end connected to the input terminal 101 and a second end arranged to make contact with a first contact 621 among a first set of contacts provided in the first multi-contact tap arrangement 620, when a first positioning stimulus is provided to the multifurcated tap changer system 605 by the voltage regulation controller 115. The second end of the contactor element 611 is further arranged to make contact with a first contact 631 among a second set of contacts provided in the second multi-contact tap arrangement 630 when a second positioning stimulus is provided to the multifurcated tap changer system 605 by the voltage regulation controller 115.

The second tap changer 615 includes a contactor element 616 (a wiper or a sliding contactor, for example) that has a first end connected to the input terminal 101 and a second end that is arranged to automatically make contact with a second contact 622 among the first set of contacts provided in the first multi-contact tap arrangement 620, when the first positioning stimulus is provided to the multifurcated tap changer system 605 by the voltage regulation controller 115. The contactor element 616 is further arranged to make contact with a second contact 632 among the second set of contacts provided in the second multi-contact tap arrangement 630 on the single coil winding 625 when the second positioning stimulus is provided to the multifurcated tap changer system 605 by the voltage regulation controller 115.

As a result of the ganged operation and connectivity provided by the first tap changer 610 and the second tap changer 615, the load current ($I_{load}$) flowing through the multifurcated tap changer system 605 is automatically divided into two parallel paths ("n" parallel paths when "n" tap change assemblies are coupled together) thereby addressing at least some aspects associated with arcing and heat dissipation. The multi-contact tap arrangements provided on the single coil winding 625 further provides for lowered contact resistance and a reduction in an amount of arcing and heat generation when the load current has a large amplitude.

FIG. 7 illustrates an exemplary mechanical arrangement for concurrently operating the contactor element 611 and the contactor element 616 of the transformer assembly 650 shown in FIG. 6. Some aspects of the operation of this mechanical arrangement can be understood in view of the description provided above with respect to the mechanical arrangement shown in FIG. 4. However, it will be pertinent to draw attention to a wiring connection 705 provided between the contact 621 and the contact 622, which constitutes a portion of the first multi-contact tap arrangement 620. The wiring connection 710 provided between the contact 631 and the contact 632 constitutes a portion of the second multi-contact tap arrangement 630.

Turning back to FIGS. 1-4 and the associated description, in one exemplary implementation in accordance with an embodiment of the disclosure, a voltage regulator system can include a voltage regulation controller and a split-coil transformer assembly. The voltage regulation controller can have a voltage sensing element. The split-coil transformer assembly, which is coupled to the voltage regulation controller, can include a first coil winding, a first tap changer, a second coil winding, and a second tap changer. The first coil winding can include a first set of taps. The first tap changer can include a first contactor element that makes contact with a first tap in the first set of taps when the voltage regulation controller provides to the split-coil transformer assembly, a first positioning stimulus that is based at least in part on the voltage sensing element sensing a first voltage deviation from a nominal output voltage of the voltage regulator system. The second coil winding, which is electrically coupled in parallel with the first coil winding, can include a second set of taps. The second tap changer is mechanically ganged to the first tap changer and can include a second contactor element arranged to make contact with a first tap in the second set of taps when the first contactor element makes contact with the first tap in the first set of taps.

In certain aspects of the embodiment of the disclosure, the first contactor element of the voltage regulator system makes contact with a second tap in the first set of taps when the voltage sensing element senses a second voltage deviation from the nominal output voltage, and the second contactor element is further arranged to make contact with a second tap in the second set of taps when the first contactor element makes contact with the second tap in the first set of taps.

In certain aspects of the embodiment of the disclosure, the voltage sensing element of the voltage regulator system can include a motor that is electrically coupled to one or more output terminals of the voltage regulator system, the motor comprising a rotor shaft that rotates to a first angular position when the motor senses the first voltage deviation from the nominal output voltage and rotates to a second angular position when the motor senses the second voltage deviation from the nominal output voltage.

In certain aspects of the embodiment of the disclosure, each of the first tap changer and the second tap changer of the voltage regulator system can include a circular plate having a central opening, that is provided for insertion of the rotor shaft of the motor.

In certain aspects of the embodiment of the disclosure, the first voltage deviation from the nominal output voltage is a positive deviation from the nominal output voltage and the second voltage deviation from the nominal output voltage is a negative deviation from the nominal output voltage.

In certain aspects of the embodiment of the disclosure, each of the positive deviation and the negative deviation is defined on a percentage basis with respect to the nominal output voltage.

In certain aspects of the embodiment of the disclosure, the split-coil transformer assembly can further include a first reversing switch and a second reversing switch. The first reversing switch is connected to the first coil winding and is operative to electrically couple one of a first end or a second end of the first coil winding to an output terminal of the voltage regulator system. The second reversing switch, which is mechanically ganged with the first reversing switch, is connected to the second coil winding, and operative to electrically couple one of a first end or a second end of the second coil winding to the output terminal of the voltage regulator system when the first reversing switch electrically couples the one of a first end or the second end of the first coil winding to the output terminal of the voltage regulator system.

In yet another embodiment of the disclosure, a method for regulating voltage can include providing a voltage regulator system having a split-coil transformer assembly. The split-coil transformer assembly can include a first coil winding, a second coil winding, a first tap changer, and a second tap changer. The first coil winding has a first set of taps. The second coil winding, which is electrically coupled in parallel with the first coil winding, has a second set of taps. The first tap changer can include a first contactor element. The second tap changer can include a second contactor element that is mechanically ganged to the first contactor element of the first tap changer. The method can also include sensing a first voltage deviation from a nominal output voltage of the voltage regulator system, and in response to sensing the first voltage deviation, activating the first contactor element to make contact with a first tap in the first set of taps and the second contactor element to make contact with a first tap in the second set of taps.

In certain aspects of the embodiment of the disclosure, the method can include sensing a second voltage deviation from the nominal output voltage of the voltage regulator system, and in response to sensing the second voltage deviation, activating the first contactor element to make contact with a second tap in the first set of taps and the second contactor element to make contact with a second tap in the second set of taps.

In certain aspects of the embodiment of the disclosure, the method can further include sensing each of the first voltage deviation and the second voltage deviation by using a motor electrically coupled to one or more output terminals of the voltage regulator system, the motor comprising a rotor shaft that rotates to a first angular position when the motor senses the first voltage deviation from the nominal output voltage and rotates to a second angular position when the motor senses the second voltage deviation from the nominal output voltage.

In certain aspects of the embodiment of the disclosure, the method can further pertain to each of the first tap changer and the second tap changer having a circular plate having a central opening for mechanically coupling, directly or indirectly, each of the first tap changer and the second tap changer to the rotor shaft of the motor.

In certain aspects of the embodiment of the disclosure, the method can further pertain to the first voltage deviation from the nominal output voltage being a positive deviation from the nominal output voltage and the second voltage deviation from the nominal output voltage being a negative deviation from the nominal output voltage.

In certain aspects of the embodiment of the disclosure, each of the positive deviation and the negative deviation is defined on a percentage basis with respect to the nominal output voltage.

In certain aspects of the embodiment of the disclosure, the method can further pertain to the split-coil transformer assembly including a first reversing switch and a second reversing switch. The first reversing switch is connected to the first coil winding and is operative to electrically couple one of a first end or a second end of the first coil winding to an output terminal of the voltage regulator system. The second reversing switch, which is mechanically ganged with the first reversing switch, is connected to the second coil winding, and operative to electrically couple one of a first end or a second end of the second coil winding to the output terminal of the voltage regulator system when the first reversing switch electrically couples the one of a first end or the second end of the first coil winding to the output terminal of the voltage regulator system.

In one exemplary implementation in accordance with an embodiment of the disclosure, a voltage regulator system can include a voltage regulation controller and a split-coil transformer assembly. The split-coil transformer assembly can include a first coil winding, a first tap changer, a first reversing switch, a second coil winding, a second tap changer, and a second reversing switch. The first coil winding has a first set of taps. The first tap changer includes a first contactor element that is configured to make contact with one of the first set of taps over a first period of time and another of the first set of taps over a second period of time. The first reversing switch is connected to the first coil winding and is operative to electrically couple one of a first end or a second end of the first coil winding to an output terminal of the voltage regulator system. The second coil winding, which is electrically coupled in parallel with the first coil winding, has a second set of taps. The second tap changer includes a second contactor element that is mechanically ganged to the first contactor element of the first tap changer. The second contactor element is configured to make contact with one of the second set of taps over the first period of time and another of the second set of taps over the second period of time. The second reversing switch is connected to the second coil winding. The second reversing switch is mechanically ganged to the first reversing switch and is operative to electrically couple one of a first end or a second end of the second coil winding to the output terminal of the voltage regulator system when the first reversing switch electrically couples the one of the first end or the second end of the first coil winding to the output terminal of the voltage regulator system.

In certain aspects of the embodiment of the disclosure, the voltage regulator system can include a voltage sensing element for sensing an output voltage of the voltage regulator system. The voltage sensing element is configured to provide a first positioning stimulus for placing the first contactor element in contact with the one of the first set of taps over the first period of time and a second positioning stimulus that is selected to place the first contactor element in contact with the another of the first set of taps over the second period of time.

In certain aspects of the embodiment of the disclosure, the voltage sensing element can include a sense coil that is configured to detect a nominal output voltage of the voltage regulator system.

In certain aspects of the embodiment of the disclosure, the sense coil can include at least one of a primary winding or a secondary winding of a motor. The motor includes a rotor shaft that rotates to a first angular position when there is a first voltage deviation from the nominal output voltage and rotates to a second angular position when there is a second voltage deviation from the nominal output voltage. Furthermore, each of the first tap changer and the second tap changer can include a circular plate having a central opening for mechanically coupling, directly or indirectly, each of the first tap changer and the second tap changer to the rotor shaft of the motor.

In certain aspects of the embodiment of the disclosure, the first voltage deviation from the nominal output voltage is a positive deviation from the nominal output voltage and the second voltage deviation from the nominal output voltage is a negative deviation from the nominal output voltage.

In certain aspects of the embodiment of the disclosure, each of the positive deviation and the negative deviation is defined on a percentage basis with respect to the nominal output voltage.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A voltage regulator system comprising:
   a voltage regulation controller comprising a voltage sensing element; and
   a transformer assembly coupled to the voltage regulation controller, the transformer assembly comprising:
      a coil winding;
      a first multi-contact tap arrangement connected to the coil winding, the first multi-contact tap arrangement comprising a first set of contacts;
      a second multi-contact tap arrangement connected to the coil winding, the second multi-contact tap arrangement comprising a second set of contacts; and
      a multifurcated tap changer system, the multifurcated tap changer system comprising:
         a first tap changer comprising a first contactor element that makes contact with a first contact in the first set of contacts when the voltage regulation controller provides to the transformer assembly, a first positioning stimulus that is based at least in part on the voltage sensing element sensing a first voltage deviation from a nominal output voltage of the voltage regulator system, and makes contact with a first contact in the second set of contacts when the voltage sensing element senses a second voltage deviation from the nominal output voltage; and
         a second tap changer that is mechanically ganged to the first tap changer, the second tap changer comprising a second contactor element that is arranged to automatically make contact with a second contact in the first set of contacts when the voltage regulation controller provides to the transformer assembly, the first positioning stimulus, and to automatically make contact with a second contact in the second set of contacts when the first contactor element makes contact with the first contact in the second set of contacts.

2. The voltage regulator system of claim 1, wherein the voltage sensing element comprises a motor electrically coupled to one or more output terminals of the voltage regulator system, the motor comprising a rotor shaft that rotates to a first angular position when the motor senses the first voltage deviation from the nominal output voltage and rotates to a second angular position when the motor senses the second voltage deviation from the nominal output voltage.

3. The voltage regulator system of claim 2, wherein the multifurcated tap changer system includes at least one circular plate having a central opening that is provided for insertion of the rotor shaft of the motor.

4. The voltage regulator system of claim 2, wherein the first voltage deviation from the nominal output voltage is either a positive or negative deviation from the nominal output voltage and the second voltage deviation from the nominal output voltage is either a negative or positive deviation from the nominal output voltage.

5. The voltage regulator system of claim 1, wherein the transformer assembly further comprises:
a reversing switch connected to the coil winding, the reversing switch operative to electrically couple one of a first end or a second end of the coil winding to an output terminal of the voltage regulator system.

6. A method of regulating voltage using a voltage regulator system comprising:
providing a voltage regulation controller comprising a voltage sensing element;
providing a transformer assembly coupled to the voltage regulation controller, the transformer assembly comprising:
a coil winding;
a first multi-contact tap arrangement connected to the coil winding, the first multi-contact tap arrangement having a first set of contacts;
a second multi-contact tap arrangement connected to the coil winding, the second multi-contact tap arrangement having a second set of contacts; and
a multifurcated tap changer system, the multifurcated tap changer system comprising a first tap changer having a first contactor element and a second tap changer that is mechanically ganged to the first tap changer, the second tap changer having a second contactor element;
sensing a first voltage deviation from a nominal output voltage of the voltage regulator system;
in response to sensing the first voltage deviation, placing the first contactor element in contact with a first contact in the first set of contacts, the second contactor element automatically and concurrently making contact with a second contact in the first set of contacts;
sensing a second voltage deviation from the nominal output voltage of the voltage regulator system; and
in response to sensing the second voltage deviation, placing the first contactor element in contact with a first contact in the second set of contacts, the second contactor element automatically and concurrently making contact with a second contact in the second set of contacts.

7. The method of claim 6, wherein sensing each of the first voltage deviation and the second voltage deviation comprises using a motor electrically coupled to one or more output terminals of the voltage regulator system, the motor comprising a rotor shaft that rotates to a first angular position when the motor senses the first voltage deviation from the nominal output voltage and rotates to a second angular position when the motor senses the second voltage deviation from the nominal output voltage.

8. The method of claim 7, wherein the multifurcated tap changer system includes at least one circular plate having a central opening that is provided for insertion of the rotor shaft of the motor.

9. The method of claim 6, wherein the first voltage deviation from the nominal output voltage is either a positive or negative deviation from the nominal output voltage and the second voltage deviation from the nominal output voltage is either a negative or positive deviation from the nominal output voltage.

10. The method of claim 9, wherein each of the positive deviation and the negative deviation is defined on a percentage basis with respect to the nominal output voltage.

11. The method of claim 6, wherein the transformer assembly further comprises:
a reversing switch connected to the coil winding, the reversing switch operative to electrically couple one of a first end or a second end of the coil winding to an output terminal of the voltage regulator system.

12. A voltage regulator system comprising:
a transformer assembly comprising:
a coil winding;
a first multi-contact tap arrangement connected to the coil winding, the first multi-contact tap arrangement having a first set of contacts;
a second multi-contact tap arrangement connected to the coil winding, the second multi-contact tap arrangement having a second set of contacts;
a first tap changer comprising a first contactor element configured to make contact with a first contact of the first set of contacts over a first period of time and a first contact of the second set of contacts over a second period of time;
a second tap changer comprising a second contactor element that is mechanically ganged to the first contactor element of the first tap changer, the second contactor element arranged to automatically make contact with a second contact of the first set of contacts over the first period of time and a second contact of the second set of contacts over the second period of time; and
a reversing switch connected to the coil winding, the reversing switch operative to electrically couple one of a first end or a second end of the coil winding for presenting a reversal of winding sense to a load current that flows through the voltage regulator system and into a load when coupled to an output terminal of the voltage regulator system; and
a voltage sensing element comprising a sense coil configured to detect a nominal output voltage of the voltage regulator system, the voltage sensing element configured to provide a first positioning stimulus for placing the first contactor element in contact with the first contact of the first set of contacts over the first period of time and a second positioning stimulus that is selected to concurrently place the first contactor element in contact with the second contact of the first set of contacts over the second period of time, the sense coil including at least a part of at least one of a primary winding or a secondary winding of a motor, the motor comprising a rotor shaft that rotates to a first angular position when there is a first voltage deviation from the nominal output voltage and rotates to a second angular position when there is a second voltage deviation from the nominal output voltage.

13. The voltage regulator system of claim 12, wherein the first voltage deviation from the nominal output voltage is either a positive or negative deviation from the nominal output voltage and the second voltage deviation from the nominal output voltage is either a negative or positive deviation from the nominal output voltage.

14. The voltage regulator system of claim 13, wherein each of the positive deviation and the negative deviation is defined on a percentage basis with respect to the nominal output voltage.

* * * * *